United States Patent
Tian et al.

(10) Patent No.: US 11,952,437 B2
(45) Date of Patent: Apr. 9, 2024

(54) PROCESSING METHOD OF NATURAL RUBBER LATEX USING CREAMING

(71) Applicant: Xiaohui Tian, Shanghai (CN)

(72) Inventors: Xiaohui Tian, Shanghai (CN); Dongqi Wang, Shanghai (CN)

(73) Assignee: Xiaohui Tian, Shanghai (CN)

( * ) Notice: Subject to any disclaimer, the term of this patent is extended or adjusted under 35 U.S.C. 154(b) by 657 days.

(21) Appl. No.: 17/260,231

(22) PCT Filed: Sep. 15, 2020

(86) PCT No.: PCT/CN2020/115191
§ 371 (c)(1),
(2) Date: Jan. 14, 2021

(87) PCT Pub. No.: WO2021/184703
PCT Pub. Date: Sep. 23, 2021

(65) Prior Publication Data
US 2022/0135707 A1    May 5, 2022

(30) Foreign Application Priority Data
Mar. 18, 2020   (CN) .......................... 202010193100.6

(51) Int. Cl.
*C08C 1/04*     (2006.01)
*C08C 1/06*     (2006.01)
*C08L 7/02*     (2006.01)

(52) U.S. Cl.
CPC ................. *C08C 1/04* (2013.01); *C08C 1/06* (2013.01); *C08L 7/02* (2013.01)

(58) Field of Classification Search
CPC ................. C08C 1/04; C08C 1/06; C08L 7/02
See application file for complete search history.

(56) References Cited

U.S. PATENT DOCUMENTS

| | | | | |
|---|---|---|---|---|
| 5,998,512 A | * | 12/1999 | Schloman | C08C 1/04 524/18 |
| 2012/0208938 A1 | * | 8/2012 | Yamamoto | C08L 15/00 524/156 |

FOREIGN PATENT DOCUMENTS

| | | |
|---|---|---|
| CN | 1321691 A | 11/2001 |
| CN | 102321197 A | 1/2012 |
| CN | 103923232 A | 7/2014 |
| GB | 660743 A | 11/1951 |
| GB | 661511 A | 11/1951 |
| IN | 105017446 A | 11/2015 |
| JP | H11106405 A | 4/1999 |

OTHER PUBLICATIONS

English Machine Translation of JPH11106405 ( A ) obtained on Sep. 22, 2023 from https://worldwide.espacenet.com/publicationDetails/biblio?II=0&ND=3&adjacent=true&locale=en_EP&FT=D&date=19990420&CC=JP&NR=H11106405A&KC=A (Year: 1999).*

* cited by examiner

*Primary Examiner* — Ling Siu Choi
*Assistant Examiner* — Olga Lucia Donahue
(74) *Attorney, Agent, or Firm* — Tutunjian & Bitetto, P.C.

(57) ABSTRACT

A processing method of natural rubber latex using creaming includes the following steps: adding a surfactant, a pH adjuster, and deionized water to natural rubber latex, adding a preservative and a creaming agent, mixing and standing a resulting mixture until phase separation occurs, and collecting an upper rubber latex phase and a lower skim latex phase, separately; diluting the upper rubber latex phase with deionized water, adding a preservative, a pH adjuster, a surfactant, and a creaming agent, mixing and standing a resulting mixture until phase separation occurs, and collecting an obtained upper rubber latex phase; and adding a preservative, a pH adjuster, a surfactant, and a creaming agent to an obtained lower skim latex phase, mixing and standing a resulting mixture until phase separation occurs, and collecting an obtained upper rubber latex phase.

20 Claims, No Drawings

PROCESSING METHOD OF NATURAL RUBBER LATEX USING CREAMING

CROSS REFERENCE TO THE RELATED APPLICATIONS

This application is the national phase entry of International Application No. PCT/CN2020/115191, filed on Sep. 15, 2020, which is based upon and claims priority to Chinese Patent Application No. 202010193100.6, filed on Mar. 18, 2020, the entire contents of which are incorporated herein by reference.

TECHNICAL FIELD

The present invention relates to a production method of natural rubber latex, and in particular to a processing method of natural rubber latex using creaming. More specifically, the present invention relates to a non-centrifugal processing method using creaming, where, natural rubber latex with high rubber purity and more concentrated rubber particle size distribution is separated and produced from a natural rubber latex slurry obtained at different time points and in different environments. The present invention belongs to the technical field of rubber processing.

BACKGROUND

Natural rubber latex exists in the form of colloid, in which rubber particles are suspended in an aqueous slurry with many non-rubber components (including phospholipids, proteins, carbohydrates, and inorganic salts). Rubber particles of rubber trees are spherical or pear-shaped under an electron microscope, and rubber biosynthesis occurs on the surface of rubber particles. Rubber particles are formed by polyisoprene chains, where, hydrophobic parts of the polyisoprene chains are closely arranged to form an internal spherical structure, and hydrophilic ends are exposed on the surface of the spherical structure. Microscopically, rubber particles include an ω-terminal-modified isoprene unit, where, the ω-terminal is successively linked to two trans-1,4-isoprene units and a long chain formed by many cis-1,4-polyisoprene units, and cis-1,4-polyisoprene long chain is then covalently linked to a monophosphate or diphosphate group called α-terminal. The ω-terminal usually binds to biosynthetic proteins, while the α-terminal is covalently linked to phospholipids. When rubber is in an anhydrous state, these binding sites can be regarded as branching points, where, the ω-terminal of a rubber chain is linked to proteins and the α-terminal is linked to phospholipids. Existing studies have shown that these naturally-occurring branching points are crucial for the excellent properties of natural rubber. Although technologies in the synthetic rubber industry are constantly improving, replication of natural rubber cannot be industrially synthesized due to the existence of the branching point network in natural rubber. Therefore, many rubber products, such as tires, auto parts, condoms, and surgical gloves, require large amounts of natural rubber.

More importantly, the rubber particles produced by a rubber tree usually have particle sizes exhibiting a bimodal distribution, including large rubber particles and small rubber particles, where, rubber particles with a particle size of 10 nm to 250 nm are regarded as small rubber particles, and rubber particles with a particle size of 250 nm to 3 μm are regarded as large rubber particles. In addition to size differences, small rubber particles have higher biosynthetic activity than large rubber particles. The surface of rubber particles is wrapped by a single layer of biofilm, and the biofilm is composed of various proteins, phospholipids and other compounds. Large and small rubber particles differ not only in molecular weight, but also in rubber chain structure and surface protein. A branching point of the molecular chain of large rubber particles comes from the aggregation of phospholipids linked to the α-terminal of the chain, which becomes a phospholipid branching point. Small rubber particles have different structure. The α-terminal of the molecular chain of small rubber particles only binds to monophosphate or diphosphate groups, but rarely binds to or does not bind to phospholipids that are easy to aggregate. This exposed site becomes an active chain terminal, which allows high biosynthetic activity. Moreover, the other end of the molecular chain of small rubber particles, namely, the ω-terminal, is linked to proteins, thus becoming a protein branching point. Studies have shown that small rubber particles are mainly composed of two independent groups of linear chain molecules that have a high molecular weight and a low molecular weight, respectively, and chain terminals of these molecules are active to achieve chain extension. Large rubber particles are mainly composed of branched molecules, where, branching points are formed by the aggregation of low-molecular-weight rubber chains through phospholipids inside or on the surface of the rubber particles. The formation of branching points makes the molecular weight of large rubber particles increase with increasing particle size. Therefore, small and large rubber particles have different branching point structures and molecular weight characteristics, which means that the particle size of rubber particles is an important factor affecting the characteristics and performance of natural rubber. For example, the α-terminal of the molecular chain of large rubber particles is linked to a phospholipid group that is easy to aggregate, serving as a natural branching network, which exhibits superior tensile strength and elasticity before vulcanization. However, small rubber particles show better performance after vulcanization, and the protein linked to the ω-terminal of the molecular chain of small rubber particles plays a role in accelerating cross-linking during a vulcanization process. At present, the commercially-available natural rubber is a mixture of a component with a low molecular weight of 100,000 to 200,000 and a component with a high molecular weight of 1,000,000 to 2,500,000. Compared with synthetic rubber, natural rubber has better raw rubber properties and processing properties and thus is often used in large tires. Rubber used for manufacturing tire tread has a weight average molecular weight (WAMW) preferably at least of 1400,000, because the strength of raw rubber will decrease at a WAMW lower than 1400,000. In addition, in natural rubber, the presence of non-rubber components such as proteins will cause the entanglement of molecular chains, thereby causing gelation, which will make the rubber viscosity rise sharply and greatly deteriorate the processability.

It is known that the large and small rubber particles in natural rubber latex are separated by a method of stepwise differential centrifugation (patent: CN 102321197). This method can hardly be industrialized due to cumbersome processes and high requirements on equipment. The structure of rubber particles will inevitably be damaged under repeated centrifugal operations. In addition, methods for reducing the content of non-rubber components in natural rubber latex include: 1) centrifuging highly-diluted rubber latex and separating concentrated rubber latex; and 2) dialyzing rubber latex through a semipermeable membrane.

SUMMARY

Technical problem to be solved by the present invention is as follows. An insurmountable shortcoming of natural rubber is that the performance of natural rubber varies with different collection regions and time points of rubber latex, which brings differences and uncertainties to the processing technology and the product performance. The present invention provides a processing method that can separate fine rubber latex with high purity and more concentrated and similar rubber particle sizes and structural characteristics, to reduce the influence of the rubber component diversity and non-rubber substances on the manufacturing technique and functional performance of natural rubber latex products.

To solve the above technical problem, the present invention provides the following technical solutions.

A processing method of natural rubber latex using creaming includes the following steps:

step 1): adding a surfactant, a pH adjuster, and deionized water to natural rubber latex, and thoroughly stirring a resulting mixture at a controlled temperature to form a latex system;

step 2): adding a preservative and a creaming agent to the natural rubber latex or the latex system obtained in step 1) and thoroughly stirring a resulting mixture; standing the resulting mixture at a controlled temperature until phase separation occurs; and collecting an upper rubber latex phase and a lower skim latex phase, separately;

step 3): diluting the upper rubber latex phase obtained in step 2) with deionized water; adding a preservative, a pH adjuster, a surfactant, and a creaming agent, and thoroughly stirring a resulting mixture; standing the resulting mixture at a controlled temperature until phase separation occurs; collecting an upper rubber latex phase; and repeating the above steps many times; where, the more the repeat times, the purer an obtained rubber latex; an upper rubber latex phase finally collected is natural rubber latex with high rubber purity and more concentrated rubber particle size distribution, and the natural rubber latex has no non-rubber substances and mainly has large rubber particles;

step 4): selecting one of lower skim latex phases obtained in step 2) and step 3) or combining two or more of the lower skim latex phases, and concentrating a resulting solution by centrifugation or directly diluting the resulting solution with deionized water; adding a preservative, a pH adjuster, a surfactant, and a creaming agent, and thoroughly stirring a resulting mixture; standing the resulting mixture at a controlled temperature until phase separation occurs; collecting an upper rubber latex phase; and repeating the above steps many times; where, the more the repeat times, the purer an obtained rubber latex; an upper rubber latex phase finally collected is natural rubber latex with high rubber purity and more concentrated rubber particle size distribution, and the natural rubber latex basically includes no non-rubber substances and has a rubber particle size related to a selected lower skim latex phase, that is, the more the separation times for obtaining the lower skim latex phase, the smaller the rubber particle size in the upper rubber latex phase.

Preferably, in step 2), urea and derivatives thereof or a protease is added to the natural rubber latex or the latex system obtained in step 1), then the preservative and the creaming agent are added for thorough stirring.

More preferably, a polar organic solvent is added while the urea and derivatives thereof or the protease is added for thorough stirring.

More preferably, the urea and derivatives thereof are at least one selected from the group consisting of urea, methyl urea, ethyl urea, n-propyl urea, isopropyl urea, n-butyl urea, isobutyl urea, and n-pentyl urea, which is added at an amount of 0.0001% to 20% of a weight of the natural rubber latex; and the protease is at least one selected from the group consisting of alkaline protease, 2079 alkaline protease, trypsin, papain, bromelain, and superase bacterial protease, which is added at an amount of 0.0001% to 15% of the weight of the natural rubber latex.

Further, the polar organic solvent is at least one selected from the group consisting of methanol, ethanol, diethyl ether, dioxane, tetrahydrofuran (THF), ethylene oxide, cyclohexane, acetone, dihydroxyacetone (DHA), propanol, 2-propanol, n-butanol, dimethyl sulfoxide (DMSO), and dimethylacetamide (DMA), which is added at an amount of 0.0001% to 30% of the weight of the natural rubber latex.

Preferably, the natural rubber latex in the steps 1) and 2) is one selected from the group consisting of fresh rubber latex from *Hevea brasiliensis* and concentrated rubber latex/skim latex thereof, *Eucommia ulmoides* rubber latex and concentrated rubber latex/skim latex thereof, and *Parthenium argentatum* rubber latex and concentrated rubber latex/skim latex thereof; and the natural rubber latex has dry rubber in a mass content of 0.5% to 70%.

Preferably, the pH adjuster in the steps 1) and 3) is at least one selected from the group consisting of monopotassium phosphate (MKP), dipotassium phosphate (DKP), monosodium phosphate (MSP), disodium phosphate (DSP), sodium phosphate, potassium acetate, sodium acetate, sulfuric acid, hydrochloric acid, nitric acid, acetic acid, succinic acid, citric acid, sodium hydroxide, ammonia water, potassium hydroxide, sodium carbonate, and sodium bicarbonate, which is added at an amount of 0.0001% to 10% of the weight of the natural rubber latex and adjusts the pH to 8 to 11. The surfactant in the steps 1), 3), and 4) is at least one selected from the group consisting of a non-ionic surfactant, an anionic surfactant, a cationic surfactant, and an amphoteric surfactant, which is added at an amount of 0.0001% to 20% of the weight of the natural rubber latex.

More preferably, the non-ionic surfactant is at least one selected from the group consisting of a polyoxyalkylene ester surfactant, a polyol fatty acid ester surfactant, a polyoxyalkylene ether surfactant, an alkyl polyglucoside (APG) surfactant, and a sugar fatty acid ester surfactant. The anionic surfactant is at least one selected from the group consisting of diphenyl ether sulfonate, alkylbenzene sulfonate, alkyl naphthalene sulfonate, naphthalene sulfonate, alkyl sulfonate, dialkyl sulfosuccinate, α-olefin sulfonate, α-sulfonated fatty acid salt, alkyl sulfate, polyoxyalkylene stilbene phenol sulfate, polyoxyalkylene sulfate, tristyrene phenol sulfate, polyoxyalkylene phenyl ether sulfate, alkyl sulfate ester salt, polyoxyalkylene alkyl sulfate, polyoxyalkylene alkyl phenyl ether sulfate, polyoxyalkylene tristyrenated phenol sulfate, polyoxyalkylene distyrenated phenol sulfate, alkyl phosphate, polyoxyalkylene phosphate, alkyl phosohate salt, and polyoxyalkylene phosphate salt. The cationic surfactant is at least one selected from the group consisting of imidazolinium salt, alkyl amine salt, an alkyl amine derivative, and an alkyl amine quaternary ammonium compound. The amphoteric surfactant is at least one selected from the group consisting of an amino acid surfactant, an amine oxide surfactant, and a betaine surfactan.

Preferably, the preservative in the steps 2), 3) and 4) is at least one selected from the group consisting of zinc oxide, benzoic acid, sodium benzoate, ammonium naphthenate, polyhexamethyleneguanidine (PHMG) and polymer derivatives thereof, tetramethylthiuram disulfide, calcium propionate, sodium diacetate, methyl p-hydroxybenzoate, ethyl p-hydroxybenzoate, propyl p-hydroxybenzoate, butyl p-hydroxybenzoate, and potassium sorbate, which is added at an amount of 0.0001% to 20% of the weight of the natural rubber latex. The creaming agent in the steps 2), 3) and 4) is at least one selected from the group consisting of a natural water-soluble polymer and modified water-soluble polymers thereof, and a synthetic water-soluble polymer, which is added at an amount of 0.0001% to 40% of the weight of the natural rubber latex.

More preferably, the natural water-soluble polymer and modified water-soluble polymers thereof are at least one selected from the group consisting of gum arabic, linseed gum, guar gum, bone glue, carrageenan, gelatin, locust bean gum, pectin, xanthan gum, konjac gum, tannin extract, *Abelmoschus manihot* gum, *Bletilla hyacinthina* gum, trehalose, ammonium alginate, sodium alginate, calcium alginate, potassium alginate, propylene glycol alginate (PGA), chitosan, chitosan oligosaccharide, water-soluble chitosan, carboxylated chitosan, chitosan salt, chitosan sulfate, hyaluronic acid-like chitosan, a copolymer of chitosan and polyvinylpyrrolidone (PVP), mucopolysaccharide, hyaluronic acid, carboxymethyl cellulose (CMC), hydroxyethyl cellulose (HEC), hydroxypropyl cellulose (HPC), methyl cellulose, ethyl cellulose, and cellulose xanthate. The synthetic water-soluble polymer is at least one selected from the group consisting of polyethyleneimine, Carbopoi resin, aluminum magnesium silicate, polyvinyl alcohol (PVA), PVA copolymer, polyacrylamide (PAM), PAM copolymer, polyacrylic acid, sodium polyacrylate, PVP, PVP copolymer, polyethylene glycol (PEG), quaternary ammonium salt polymer, polyoxyethylene, polyoxyethylene ether, polyoxypropylene, and polyglycerol glycidyl ether.

Preferably, the stirring in the steps 1), 2), 3) and 4) is conducted for 20 min to 48 h at a temperature of 5° C. to 55° C. and a stirring speed of 30 rpm to 600 rpm; and the standing is conducted for 5 h to 10 d at the temperature of 5° C. to 55° C.

Preferably, the phase separation in the steps 2), 3) and 4) is identified by visual inspection, transmittance contrast, or ultrasonic detection.

The present invention further provides use of the above processing method of natural rubber latex using creaming in reducing a non-rubber component content in natural rubber latex.

The present invention further provides a rubber latex obtained by the above processing method of natural rubber latex using creaming.

The present invention provides a natural rubber latex with a stable structure and composition to improve the mechanical precision of products manufactured therefrom. Moreover, the present invention does not require high-speed centrifugation, thus avoiding the damage to a rubber molecular chain by high-speed shearing force and keeping the excellent performance of rubber particles themselves to the greatest extent.

The present invention does not require any centrifugation steps and semipermeable membrane conditions for natural rubber latex, so that rubber particles in the natural rubber latex remain in an intact form. In addition, the present invention does not require mechanical equipment with high requirements, such as centrifuges, and thus almost has no limitations in large-scale production. The protein, phosphate, phospholipid, and other non-rubber components in natural rubber latex are present in the structure by participating in the branching of rubber molecular chains, and many are also freely dispersed in a water phase or weakly attached to the surface of rubber particles. In the present invention, reagents such as a surfactant and a creaming agent are added to natural rubber latex to make rubber particles aggregate without flocculation, thus achieving creaming. Rubber has a specific gravity of 0.93 g/cm$^3$, and non-rubber components have a specific gravity of 1.03 g/cm$^3$. The size of rubber particles is related to the content of non-rubber components attached to the surface of rubber particles, namely, related to the specific gravity. In a slurry undergoing creaming, rubber particles with a high specific gravity and free non-rubber substances are easy to settle at the bottom of the slurry, rubber particles with a low specific gravity are easy to float at the top of the slurry, and rubber particles with close specific gravities, namely, those with similar sizes, are easily concentrated in the same region of the slurry. Given the different specific gravities of large and small rubber particles, sedimentation or floating can make rubber particles of similar particle sizes gather in the same phase. Liquid phases in different regions have different solid contents, and a phase interface can be identified by visual inspection, transmittance contrast or ultrasonic detection to achieve effective separation. The rubber latex in a desired phase is collected and separated from the slurry rich in free non-rubber substances at the bottom.

In the present invention, the protease, urea and polar organic solvent are added to more thoroughly decompose and remove non-rubber components such as proteins and phospholipids inside and on the surface of rubber particles. The creaming agent and pH adjuster are added and the stirring time and temperature are set to disrupt the original emulsion balance of rubber particles, thus realizing the dispersion, recombination and reaggregation of the rubber particles. The surfactant is a protective agent that maintains the aggregation of rubber particles without flocculation. According to different purposes, these relevant steps can be arbitrarily selected for processing natural rubber latex using creaming, and obtained products can be used in diversified applications.

Conventional natural rubber tends to harden over time during storage (storage hardening), so it needs to be plasticized before use. The natural rubber latex processed by creaming in the present invention basically includes no non-rubber components such as proteins, so natural rubber obtained from coagulation of the latex will no longer undergo storage hardening and exhibits a low Mooney viscosity and excellent processing properties, which is equal to or even better than synthetic rubber especially in terms of transparency and colorless appearance.

Advantages of the present invention are as follows. The present invention reduces the content of non-rubber components in natural rubber latex by processing using creaming. The creaming phase separation is adopted, which has low requirements on equipment and simple and easy technical operations, and thus is suitable for industrial production. The size and structure of rubber particles in the obtained rubber latex are controllable, which avoids the uncertainty of the contents of large and small rubber particles in natural rubber latex, and solves the long-standing processing problem of natural rubber that the performance of natural rubber is affected by the source and collection time of rubber latex. Compared with the rubber latex recovered by centrifugal separation, the natural rubber latex produced in the present invention has more concentrated rubber particle sizes and structures and includes a very low content of free non-rubber substances. The obtained rubber latex has stable processing performance, and products manufactured therefrom have stable functional performance, which is not affected by the time and region of collecting rubber latex.

The present invention can be applied to the prevention of allergies caused by natural rubber, such as surgical gloves, examination gloves, protective films, masks, medical self-adhesive bandages and adhesives, tires, shockproof pads, etc.

DETAILED DESCRIPTION OF THE EMBODIMENTS

In order to make the present invention more understandable, preferred examples are provided for detail illustration as follows.

Example 1

100 parts by weight (solid matrix) of commercially available high-ammonia natural rubber latex (dry rubber content: 60 wt %) were used as natural rubber latex to be processed by creaming. The commercially available high-ammonia natural rubber latex was poured into a glass or other transparent material container, and 10 parts by weight of a 10 wt % surfactant (shown in Table 1) aqueous solution and 5 parts by weight of a 10 wt % preservative (a mixture of sodium benzoate and ammonium naphthenate in a weight ratio of 50:50) aqueous solution were added, separately. Deionized water was added to enable a total solid content of 40 wt %. The pH was adjusted to 10 with a pH adjuster (a mixture of potassium hydroxide and dipotassium phosphate (DKP) in a weight ratio of 70:30), and the temperature was controlled at 25° C. A resulting mixture was stirred at a rotational speed of 120 rpm for 2 h and then stood for 2 h. Then, 10 parts by weight of a 5 wt % creaming agent (shown in Table 1) aqueous solution were added, and deionized water was replenished to enable a total solid content of 25 wt %. A resulting solution was stirred at a rotational speed of 100 rpm and a controlled temperature of 25° C. for more than 4 h to make the solution thoroughly mixed, and then stood for 48 h. A creaming state was observed by visual inspection, resulting upper and lower rubber latexes were collected and weighed, separately, and the solid content was determined. A small part of the upper rubber latex was diluted or coagulated by thermal evaporation, and the particle size distribution and aqueous extractable protein were determined. The particle size test was conducted using a Malvern ZEN3700 laser particle size analyzer at 25° C. The proportions of large and small rubber particles could be calculated according to a particle size bimodal distribution curve. The remaining upper rubber latex was again used as natural rubber latex to be processed by creaming, and the above operations were repeated for two cycles. The results are shown in Table 1.

TABLE 1

(Examples 1 to 10)

| Example | Surfactant | Creaming agent (weight ratio) | Creaming rate [a] (wt %) | Solid content (wt %) in the upper/lower layer | Large/small rubber particles [e] (wt %) | Aqueous extractable protein [f] (µg/g) | Non-rubber substance content (wt %) |
|---|---|---|---|---|---|---|---|
| 1 | trialkylsulfoalkylene ammonium betaine | a mixture of polyoxyethylene ether and hyaluronic acid (40:60) | [b] 88 [c] 90 [d] 90 | [b] 27/8 [c] 27/6 [d] 28/4 | [b] 86:14 [c] 90:10 [d] 93:7 | [b] <80 [c] <60 [d] <20 | [b] <0.5 [c] <0.3 [d] <0.2 |
| 2 | sodium dodecyl sulfate (SDS) | a mixture of sodium polyacrylate and xanthan gum (30:70) | [b] 59 [c] 60 [d] 60 | [b] 40/5 [c] 41/3 [d] 43/2 | [b] 88:12 [c] 91:9 [d] 95:5 | [b] <50 [c] <30 [d] <10 | [b] <0.5 [c] <0.2 [d] <0.1 |
| 3 | sodium dodecyl benzene sulfonate (SDBS) | a mixture of polyvinyl alcohol (PVA) and polyacrylamide (PAM) (40:60) | [b] 63 [c] 65 [d] 65 | [b] 35/7 [c] 37/5 [d] 37/3 | [b] 86:14 [c] 90:10 [d] 94:6 | [b] <50 [c] <40 [d] <10 | [b] <0.5 [c] <0.2 [d] <0.1 |
| 4 | sodium 1-naphthalenesulfonate | a mixture of polyethylene glycol (PEG) and polyvinylpyrrolidone (PVP) (40:60) | [b] 38 [c] 40 [d] 44 | [b] 55/8 [c] 55/5 [d] 55/3 | [b] 83:17 [c] 88:12 [d] 90:10 | [b] <80 [c] <60 [d] <30 | [b] <0.7 [c] <0.4 [d] <0.3 |
| 5 | sodium dodecyl diphenyl ether disulfonate | a mixture of a PVA-grafted poly(ε-caprolactone) copolymer and pectin (50:50) | [b] 43 [c] 50 [d] 50 | [b] 47/6 [c] 50/4 [d] 50/4 | [b] 87:13 [c] 90:10 [d] 91:9 | [b] <60 [c] <50 [d] <20 | [b] <0.6 [c] <0.3 [d] <0.3 |
| 6 | polyoxyalkylene stilbene phenol sodium sulfate | a mixture of PAM and sodium alginate (30:70) | [b] 63 [c] 65 [d] 65 | [b] 37/5 [c] 38/5 [d] 38/4 | [b] 87:13 [c] 92:8 [d] 97:3 | [b] <80 [c] <70 [d] <30 | [b] <0.7 [c] <0.5 [d] <0.2 |
| 7 | polyoxyalkylene tristyrenated phenol ether | a mixture of PVA and propylene glycol alginate (PGA) (50:50) | [b] 60 [c] 61 [d] 61 | [b] 37/10 [c] 37/8 [d] 38/7 | [b] 84:16 [c] 85:15 [d] 89:11 | [b] <80 [c] <70 [d] <50 | [b] <0.6 [c] <0.4 [d] <0.4 |
| 8 | ammonium diphenyl ether sulfonate | a mixture of polyglycerol glycidyl ether and carboxylated chitosan (60:40) | [b] 73 [c] 75 [d] 75 | [b] 30/6 [c] 31/6 [d] 32/4 | [b] 85:15 [c] 88:1 [d] 91:9 | [b] <80 [c] <60 [d] <30 | [b] <0.7 [c] <0.4 [d] <0.3 |
| 9 | polyoxyalkylene alkyl phenyl ether | a mixture of polypyrrolidone-grafted chitosan copolymer and a tannin extract (60:40) | [b] 40 [c] 40 [d] 42 | [b] 58/7 [c] 59/7 [d] 59/5 | [b] 84:16 [c] 86:14 [d] 89:11 | [b] <80 [c] <70 [d] <20 | [b] <0.7 [c] <0.5 [d] <0.4 |

TABLE 1-continued (Examples 1 to 10)

| Example | Surfactant | Creaming agent (weight ratio) | Creaming rate [a] (wt %) | Solid content (wt %) in the upper/lower layer | Large/small rubber particles [e] (wt %) | Aqueous extractable protein [f] (μg/g) | Non-rubber substance content (wt %) |
|---|---|---|---|---|---|---|---|
| 10 | sodium octadecylamine acetate and alkyl polyglucoside (APG) | a mixture of carboxymethyl cellulose (CMC) and carrageenan (50:50) | [b] 69<br>[c] 71<br>[d] 71 | [b] 33/8<br>[c] 35/7<br>[d] 35/5 | [b] 87:15<br>[c] 91:9<br>[d] 92:8 | [b] <60<br>[c] <40<br>[d] <20 | [b] <0.5<br>[c] <0.3<br>[d] <0.2 | where:
[a] indicates creaming rate = (weight of upper rubber latex/weight of total rubber latex) × 100%;
[b] indicates one cycle,
[c] indicates two cycles, and
[d] indicates three cycles;
[e] indicates that large rubber particles are those with a particle size greater than 250 nm and small rubber particles are those with a particle size less than or equal to 250 nm; and
[f] indicates ASTM D5712 film water-soluble protein detection.

Example 11

100 parts by weight (solid matrix) of fresh natural rubber latex (Fresh NR: dry rubber content: 30 wt %) were used as natural rubber latex to be processed by creaming. The natural rubber latex was poured into a glass or other transparent material container, and 10 parts by weight of a 10 wt % SDS aqueous solution, 1 part by weight of a 10 wt % urea aqueous solution, 10 parts by weight of a 5 wt % ethyl p-hydroxybenzoate aqueous solution, and 1 part by weight of a 10 wt % ethanol aqueous solution were added. The pH was adjusted to 10.5 with a pH adjuster (a mixture of potassium hydroxide and ammonia water), and the temperature was controlled at 30° C. A resulting mixture was stirred at a rotational speed of 160 rpm for 3 h and then stood for 3 h. 20 parts by weight of a 2 wt % creaming agent (a mixture of polyoxyethylene ether and locust gum in a weight ratio of 20:80) aqueous solution were added, and deionized water was replenished to enable a total solid content of 15 wt %. A resulting solution was stirred at a rotational speed of 100 rpm for 6 h to make the solution thoroughly mixed, and then stood for 2 d. A creaming state was observed by visual inspection, resulting upper and lower rubber latexes were collected and weighed, separately, and the solid content was determined. A small part was taken from each of the upper and lower rubber latexes to be diluted or coagulated by thermal evaporation, and the particle size distribution, aqueous extractable protein, and non-rubber substance content were determined. The particle size test was conducted using a Malvern ZEN3700 laser particle size analyzer at 25° C. The proportions of large and small rubber particles could be calculated according to a particle size bimodal distribution curve. The results are shown in Table 2.

TABLE 2

(Example 11)

| Example 13 | Creaming rate [a] (wt %) | Solid content (wt %) | Large/small rubber particles [b] (wt %) | Aqueous extractable protein [c] (μg/g) | Non-rubber substance content (wt %) |
|---|---|---|---|---|---|
| Upper layer | 23 | 46 | 80:20 | <100 | <1.0 |
| Lower layer | 77 | 7 | 21:79 | >400 | >4.0 | where:
[a] indicates creaming rate = (weight of rubber latex in the upper or lower layer/weight of total rubber latex) × 100%;
[b] indicates that large rubber particles are those with a particle size greater than 250 nm and small rubber particles are those with a particle size less than or equal to 250 nm; and
[c] indicates ASTM D5712 film water-soluble protein detection.

The remaining upper rubber latex was again used as natural rubber latex to be processed by creaming, and the following operations in Examples 12 to 16 were conducted. The remaining lower rubber latex was again used as natural rubber latex to be processed by creaming, and the following operations in Examples 17 to 21 were conducted.

Examples 12 to 16

The remaining upper rubber latex in Example 11 was poured into a glass or other transparent material container as natural rubber latex to be processed by creaming, and the following steps were conducted: Based on 100 parts by weight (solid matrix) of the upper rubber latex, 10 parts by weight of a 5 wt % surfactant (shown in Table 3) aqueous solution and 5 parts by weight of a 5 wt % preservative (a mixture of polyhexamethyleneguanidine (PHMG) and ammonium naphthenate in a weight ratio of 50:50) aqueous solution were added, and then deionized water was replenished to enable a total solid content of 40 wt %. The pH was adjusted to 11 with a pH adjuster (a mixture of monopotassium phosphate (MKP) and ammonia water in a weight ratio of 50:50), and the temperature was controlled at 30° C. A resulting mixture was stirred at a rotational speed of 100 rpm for 2 h and then stood for 2 h. 8 parts by weight of a 5 wt % creaming agent (shown in Table 3) aqueous solution were added, and deionized water was replenished to enable a total solid content of 20 wt %. A resulting solution was stirred at a rotational speed of 100 rpm and a controlled temperature of 30° C. for 4 h to make the solution thoroughly mixed, and then stood for 24 h. A creaming state was observed by visual inspection, resulting upper and lower rubber latexes were collected and weighed, separately, and the solid content was determined. A small part of the upper rubber latex was diluted or coagulated by thermal evaporation, and the particle size distribution and aqueous extractable protein were determined. The particle size test was conducted using a Malvern ZEN3700 laser particle size analyzer at 25° C. The proportions of large and small rubber particles could be calculated according to a particle size bimodal distribution curve. The remaining upper rubber latex was again used as natural rubber latex to be processed by creaming, and the above operations were repeated for two cycles. The results are shown in Table 3.

TABLE 3

(Examples 12 to 16)

| Example | Surfactant | Creaming agent (weight ratio) | Creaming rate $^a$ (wt %) | Solid content (wt %) in the upper/lower layer | Large/small rubber particles $^e$ (wt %) | Aqueous extractable protein $^f$ (μg/g) | Non-rubber substance content (wt %) |
|---|---|---|---|---|---|---|---|
| 12 | trialkylsulfoalkylene ammonium betaine | PVA-grafted polyglycidyl methacrylate (PGMA) copolymer | $^b$ 70 $^c$ 70 $^d$ 71 | $^b$ 27/5 $^c$ 27/4 $^d$ 29/3 | $^b$ 88:12 $^c$ 90:10 $^d$ 94:6 | $^b$ <50 $^c$ <40 $^d$ <10 | $^b$ <0.6 $^c$ <0.3 $^d$ <0.2 |
| 13 | SDS | a mixture of polyoxyethylene ether and locust gum (50:50) | $^b$ 45 $^c$ 45 $^d$ 46 | $^b$ 44/4 $^c$ 46/4 $^d$ 47/2 | $^b$ 88:12 $^c$ 91:9 $^d$ 95:5 | $^b$ <60 $^c$ <50 $^d$ <20 | $^b$ <0.5 $^c$ <0.2 $^d$ <0.1 |
| 14 | SDBS | a mixture of PVA and gelatin (50:50) | $^b$ 65 $^c$ 66 $^d$ 66 | $^b$ 28/6 $^c$ 29/5 $^d$ 29/3 | $^b$ 87:14 $^c$ 90:10 $^d$ 91:9 | $^b$ <70 $^c$ <40 $^d$ <30 | $^b$ <0.7 $^c$ <0.5 $^d$ <0.3 |
| 15 | sodium 1-naphthalenesulfonate | a mixture of PEG and sodium polyacrylate (50:50) | $^b$ 60 $^c$ 60 $^d$ 61 | $^b$ 30/5 $^c$ 31/5 $^d$ 32/2 | $^b$ 83:17 $^c$ 89:11 $^d$ 90:10 | $^b$ <80 $^c$ <60 $^d$ <30 | $^b$ <0.7 $^c$ <0.5 $^d$ <0.4 |
| 16 | sodium dodecyl diphenyl ether disulfonate | PVA-grafted polypyrrolidone copolymer | $^b$ 55 $^c$ 56 $^d$ 56 | $^b$ 33/6 $^c$ 34/6 $^d$ 35/4 | $^b$ 87:13 $^c$ 89:11 $^d$ 91:9 | $^b$ <70 $^c$ <50 $^d$ <20 | $^b$ <0.7 $^c$ <0.5 $^d$ <0.4 | where:
$^a$ indicates creaming rate = (weight of upper rubber latex/weight of total rubber latex) × 100%;
$^b$ indicates one cycle,
$^c$ indicates two cycles, and
$^d$ indicates three cycles;
$^e$ indicates that large rubber particles are those with a particle size greater than 250 nm and small rubber particles are those with a particle size less than or equal to 250 nm; and
$^f$ indicates ASTM D5712 film water-soluble protein detection.

Examples 17 to 21

The remaining lower rubber latex in Example 11 was poured into a glass or other transparent material container as natural rubber latex to be processed by creaming, and the following steps were conducted: Based on 100 parts by weight (solid matrix) of the lower rubber latex, 6 parts by weight of a 5 wt % creaming agent (shown in Table 4) aqueous solution and 2 parts by weight of a 10 wt % preservative (a mixture of PHMG and potassium sorbate in a weight ratio of 70:30) aqueous solution were added. The pH was adjusted to 10 with a pH adjuster (a mixture of MKP and citric acid), and the temperature was controlled at 25° C. A resulting solution was stirred at a rotational speed of 180 rpm for 4 h to make the solution thoroughly mixed, and then stood for 3 d. A creaming state was observed by visual inspection, resulting upper and lower rubber latexes were collected and weighed, separately, and the solid content was determined. A small part of the lower rubber latex was diluted or coagulated by thermal evaporation, and the particle size distribution and aqueous extractable protein were determined. The particle size test was conducted using a Malvern ZEN3700 laser particle size analyzer at 25° C. The proportions of large and small rubber particles could be calculated according to a particle size bimodal distribution curve. The remaining lower rubber latex was again used as natural rubber latex to be processed by creaming, and the above operations were repeated for one cycle. The results are shown in Table 4.

TABLE 4

(Examples 17 to 21)

| Example | Creaming agent (weight ratio) | Creaming rate $^a$ (wt %) | Solid content (wt %) in the upper/lower layer | Large/small rubber particles $^d$ (wt %) | Aqueous extractable protein $^e$ (μg/g) | Non-rubber substance content (wt %) |
|---|---|---|---|---|---|---|
| 17 | a mixture of hyaluronic acid-like chitosan and konjac gum (50:50) | $^b$ 55 $^c$ 55 | $^b$ 10/2 $^c$ 6/1 | $^b$ 18:82 $^c$ 13:87 | $^b$ >600 $^c$ >900 | $^b$ >10 $^c$ >13 |
| 18 | a mixture of polyglycerol glycidyl ether and pectin (30:70) | $^b$ 41 $^c$ 42 | $^b$ 13/3 $^c$ 5/1 | $^b$ 19:81 $^c$ 15:85 | $^b$ >600 $^c$ >1000 | $^b$ >10 $^c$ >15 |
| 19 | a mixture of PVA and guar gum (50:50) | $^b$ 59 $^c$ 61 | $^b$ 9/3 $^c$ 5/1 | $^b$ 19:81 $^c$ 12:88 | $^b$ >600 $^c$ >1000 | $^b$ >10 $^c$ >15 |
| 20 | a mixture of PEG and ammonium alginate (50:50) | $^b$ 45 $^c$ 45 | $^b$ 11/3 $^c$ 7/1 | $^b$ 19:81 $^c$ 16:84 | $^b$ >600 $^c$ >1000 | $^b$ >10 $^c$ >15 |

TABLE 4-continued (Examples 17 to 21)

| Example | Creaming agent (weight ratio) | Creaming rate [a] (wt %) | Solid content (wt %) in the upper/lower layer | Large/small rubber particles [d] (wt %) | Aqueous extractable protein [e] (μg/g) | Non-rubber substance content (wt %) |
|---|---|---|---|---|---|---|
| 21 | a mixture of CMC and calcium alginate (10:90) | [b] 50 [c] 51 | [b] 10/2 [c] 6/1 | [b] 17:83 [c] 12:88 | [b] >600 [c] >1000 | [b] >10 [c] >14 | where:
[a] indicates creaming rate = (weight of lower rubber latex/weight of total rubber latex) × 100%;
[b] indicates one cycle and
[c] indicates two cycles;
[d] indicates that large rubber particles are those with a particle size greater than 250 nm and small rubber particles are those with a particle size less than or equal to 250 nm; and
[e] indicates ASTM D5712 film water-soluble protein detection.

Example 22

100 parts by weight (solid matrix) of fresh natural rubber latex (Fresh NR: dry rubber content: 30 wt %) were used as natural rubber latex to be processed by creaming. The natural rubber latex was poured into a glass or other transparent material container, and 15 parts by weight of a 10 wt % surfactant (a mixture of SDS and polyoxyalkylene ether in a weight ratio of 70:30) aqueous solution, 2 parts by weight of a 10 wt % alkaline protease aqueous solution, 10 parts by weight of a 5 wt % ammonium naphthenate aqueous solution, and 1 part by weight of a 10 wt % methanol aqueous solution were added. The pH was adjusted to 11 with a pH adjuster (a mixture of potassium hydroxide and ammonia water), and the temperature was controlled at 38° C. A resulting solution was stirred at a rotational speed of 100 rpm for 48 h, heated to 70° C. and kept at this temperature for 30 min, and then cooled to room temperature. 10 parts by weight of a 2 wt % creaming agent (a mixture of sodium polyacrylate and carboxylated chitosan in a weight ratio of 10:90) aqueous solution were added, and deionized water was replenished to enable a total solid content of 15 wt %. A resulting solution was stirred at a rotational speed of 120 rpm for 6 h to make the solution thoroughly mixed, and then stood for 2 d. A creaming state was observed by visual inspection based on light transmission, resulting upper and lower rubber latexes were collected and weighed, separately, and the solid content was determined. A small part was taken from each of the upper and lower rubber latexes to be diluted or coagulated by thermal evaporation, and the particle size distribution, aqueous extractable protein, and non-rubber substance content were determined. The particle size test was conducted using a Malvern ZEN3700 laser particle size analyzer at 25° C. The proportions of large and small rubber particles could be calculated according to a particle size bimodal distribution curve. The results are shown in Table 5.

TABLE 5

(Example 22)

| Example 24 | Creaming rate [a] (wt %) | Solid content (wt %) | Large/small rubber particles [b] (wt %) | Aqueous extractable protein [c] (μg/g) | Non-rubber substance content (wt %) |
|---|---|---|---|---|---|
| Upper layer | 40 | 30 | 81:19 | <100 | <1.0 |
| Lower layer | 60 | 5 | 10:90 | >300 | >2.0 | where:
[a] indicates creaming rate = (weight of rubber latex in the upper or lower layer/weight of total rubber latex) × 100%;
[b] indicates that large rubber particles are those with a particle size greater than 250 nm and small rubber particles are those with a particle size less than or equal to 250 nm; and
[c] indicates ASTM D5712 film water-soluble protein detection.

The remaining upper rubber latex was again used as natural rubber latex to be processed by creaming, and the following operations in Examples 23 to 27 were conducted. The remaining lower rubber latex was again used as natural rubber latex to be processed by creaming, and the following operations in Examples 28 to 32 were conducted.

Examples 23 to 27

The remaining upper rubber latex in Example 22 was poured into a glass or other transparent material container as natural rubber latex to be processed by creaming, and the following steps were conducted: Based on 100 parts by weight (solid matrix) of the upper rubber latex, 5 parts by weight of a 5 wt % surfactant (shown in Table 6) aqueous solution, 5 parts by weight of a 5 wt % creaming agent (shown in Table 6) aqueous solution, and 2 parts by weight of a 5 wt % PHMG aqueous solution were added, and then deionized water was replenished to enable a total solid content of 20 wt %. The pH was adjusted to 11 with a pH adjuster (a mixture of MKP and ammonia water in a weight ratio of 50:50), and the temperature was controlled at 40° C. A resulting solution was stirred at a rotational speed of 100 rpm for 4 h to make the solution thoroughly mixed, cooled to room temperature, and then stood for 24 h. A creaming state was observed by visual inspection based on light transmission, resulting upper and lower rubber latexes were collected and weighed, separately, and the solid content was determined. A small part of the upper rubber latex was diluted or coagulated by thermal evaporation, and the particle size distribution and aqueous extractable protein were determined. The particle size test was conducted using a Malvern ZEN3700 laser particle size analyzer at 25° C. The proportions of large and small rubber particles could be calculated according to a particle size bimodal distribution curve. The remaining upper rubber latex was again used as natural rubber latex to be processed by creaming, and the above operations were repeated for two cycles. The results are shown in Table 6.

TABLE 6

(Examples 23 to 27)

| Example | Surfactant | Creaming agent (weight ratio) | Creaming rate $^a$ (wt %) | Solid content (wt %) in the upper/lower layer | Large/small rubber particles $^e$ (wt %) | Aqueous extractable protein $^f$ (μg/g) | Non-rubber substance content (wt %) |
|---|---|---|---|---|---|---|---|
| 23 | potassium polyoxyalkylene sulfate | a mixture of PEG and pectin (30:70) | $^b$ 40 $^c$ 40 $^d$ 41 | $^b$ 41:6 $^c$ 44:4 $^d$ 46:3 | $^b$ 85:15 $^c$ 89:11 $^d$ 92:8 | $^b$ <80 $^c$ <70 $^d$ <40 | $^b$ <0.6 $^c$ <0.3 $^d$ <0.3 |
| 24 | sodium polyoxyalkylene alkyl phenyl ether sulfate | a mixture of PAM and konjac gum (50:50) | $^b$ 53 $^c$ 55 $^d$ 55 | $^b$ 33:5 $^c$ 34:4 $^d$ 35:4 | $^b$ 86:14 $^c$ 90:10 $^d$ 93:7 | $^b$ <80 $^c$ <60 $^d$ <30 | $^b$ <0.5 $^c$ <0.3 $^d$ <0.2 |
| 25 | sodium 1-naphthalenesulfonate | a mixture of PVA and Carbomer (50:50) | $^b$ 60 $^c$ 60 $^d$ 62 | $^b$ 29:6 $^c$ 31:4 $^d$ 31:3 | $^b$ 85:15 $^c$ 91:11 $^d$ 92:8 | $^b$ <80 $^c$ <60 $^d$ <30 | $^b$ <0.7 $^c$ <0.5 $^d$ <0.3 |
| 26 | potassium polyoxyalkylene phosphate | a mixture of polyoxyethylene ether and carboxylated chitosan (50:50) | $^b$ 35 $^c$ 37 $^d$ 37 | $^b$ 48:5 $^c$ 49:4 $^d$ 51:3 | $^b$ 84:16 $^c$ 89:11 $^d$ 91:9 | $^b$ <80 $^c$ <70 $^d$ <40 | $^b$ <0.7 $^c$ <0.5 $^d$ <0.4 |
| 27 | SDBS | a mixture of sodium polyacrylate and xanthan gum (20:80) | $^b$ 50 $^c$ 50 $^d$ 51 | $^b$ 34:6 $^c$ 36:4 $^d$ 36:4 | $^b$ 86:14 $^c$ 91:9 $^d$ 93:7 | $^b$ <80 $^c$ <60 $^d$ <30 | $^b$ <0.6 $^c$ <0.5 $^d$ <0.2 | where:
$^a$ indicates creaming rate = (weight of upper rubber latex/weight of total rubber latex) × 100%;
$^b$ indicates one cycle,
$^c$ indicates two cycles, and
$^d$ indicates three cycles;
$^e$ indicates that large rubber particles are those with a particle size greater than 250 nm and small rubber particles are those with a particle size less than or equal to 250 nm; and
$^f$ indicates ASTM D5712 film water-soluble protein detection.

Examples 28 to 32

The remaining lower rubber latex in Example 22 was poured into a glass or other transparent material container as natural rubber latex to be processed by creaming, and the following steps were conducted: Based on 100 parts by weight (solid matrix) of the lower rubber latex, 1 part by weight of a 5 wt % creaming agent (shown in Table 7) aqueous solution and 1 part by weight of a 10 wt % preservative (a mixture of PHMG and ammonium naphthenate in a weight ratio of 50:50) aqueous solution were added. The pH was adjusted to 10.5 with a pH adjuster (a mixture of MKP and potassium hydroxide), and the temperature was controlled at 25° C. A resulting solution was stirred at a rotational speed of 180 rpm for 4 h to make the solution thoroughly mixed, and then stood for 4 d. A creaming state was observed by visual inspection, resulting upper and lower rubber latexes were collected and weighed, separately, and the solid content was determined. A small part of the upper rubber latex was diluted or coagulated by thermal evaporation, and the particle size distribution and aqueous extractable protein were determined. The particle size test was conducted using a Malvern ZEN3700 laser particle size analyzer at 25° C. The proportions of large and small rubber particles could be calculated according to a particle size bimodal distribution curve. The remaining upper rubber latex was again used as natural rubber latex to be processed by creaming, and the above operations were repeated for one cycle. The results are shown in Table 7.

TABLE 7

(Examples 28 to 32)

| Example | Creaming agent (weight ratio) | Creaming rate $^a$ (wt %) | Solid content (wt %) in the upper/lower layer | Large/small rubber particles $^d$ (wt %) | Aqueous extractable protein $^e$ (μg/g) | Non-rubber substance content (wt %) |
|---|---|---|---|---|---|---|
| 28 | PVA-grafted poly(isopropylacrylamide) copolymer | $^b$ 60 $^c$ 60 | $^b$ 9/2 $^c$ 11/1 | $^b$ 45:55 $^c$ 60:40 | $^b$ <200 $^c$ <100 | $^b$ <2 $^c$ <1 |
| 29 | a mixture of PAM and carrageenan (50:50) | $^b$ 55 $^c$ 55 | $^b$ 10/2 $^c$ 11/2 | $^b$ 40:60 $^c$ 58:42 | $^b$ <200 $^c$ <100 | $^b$ <2 $^c$ <1 |
| 30 | a mixture of PEG and water-soluble chitosan (30:70) | $^b$ 27 $^c$ 30 | $^b$ 11/2 $^c$ 13/1 | $^b$ 38:62 $^c$ 54:46 | $^b$ <200 $^c$ <100 | $^b$ <2 $^c$ <1 |
| 31 | a mixture of hydroxypropyl cellulose (HPC) and gum arabic (30:70) | $^b$ 35 $^c$ 37 | $^b$ 9/3 $^c$ 12/2 | $^b$ 49:51 $^c$ 61:30 | $^b$ <200 $^c$ <100 | $^b$ <2 $^c$ <1 |

TABLE 7-continued (Examples 28 to 32)

| Example | Creaming agent (weight ratio) | Creaming rate [a] (wt %) | Solid content (wt %) in the upper/lower layer | Large/small rubber particles [d] (wt %) | Aqueous extractable protein [e] (μg/g) | Non-rubber substance content (wt %) |
|---|---|---|---|---|---|---|
| 32 | PVA-grafted PGMA copolymer | [b] 46 [c] 46 | [b] 7/3 [c] 9/1 | [b] 34:66 [c] 57:43 | [b] <200 [c] <100 | [b] <2 [c] <1 | where:
[a] indicates creaming rate = (weight of upper rubber latex/weight of total rubber latex) × 100%;
[b] indicates one cycle and
[c] indicates two cycles;
[d] indicates that large rubber particles are those with a particle size greater than 250 nm and small rubber particles are those with a particle size less than or equal to 250 nm; and
[e] indicates ASTM D5712 film water-soluble protein detection.

What is claimed is:

1. A processing method of a natural rubber latex using creaming, comprising the following steps:
   step 1): adding a surfactant, a first pH adjuster, a first preservative, and deionized water to the natural rubber latex to obtain a first resulting mixture with a pH value of 8-11, and thoroughly stirring the first resulting mixture at a temperature of 5-55° C. to form a latex system;
   step 2): adding a first creaming agent and deionized water to the latex system obtained in step 1) to obtain a second resulting mixture and thoroughly stirring the second resulting mixture at a temperature of 5-55° C.; standing the second resulting mixture at the temperature of 5-55° C. until a first phase separation occurs; and collecting a first upper rubber latex phase and a first lower skim latex phase, separately;
   step 3): subjecting the first upper rubber latex phase to steps 1) and 2) repeatedly for a plurality of times, to obtain a first final rubber latex, wherein at least 83 wt % rubber particles in the first final rubber latex have a particle size of greater than 250 nm; and
   step 4): adding a second creaming agent, a second pH adjuster, a second preservative, and deionized water to the first lower skim latex phase or a combination of the first lower skim latex phase and a lower skim latex phase obtained in step 3), to obtain a third resulting mixture with a pH value of 8-11, and thoroughly stirring the third resulting mixture at a temperature of 5-55° C.; standing the third resulting mixture at the temperature of 5-55° C. until a second phase separation occurs; collecting a second upper rubber latex phase; and repeating this step to obtain a second final rubber latex, wherein in the repeating of step 4) the second upper rubber is used as the first lower skim latex phase, and at least 81 wt % of rubber particles in the second final rubber latex have a particle size of not greater than 250 nm,
   wherein the natural rubber latex has dry rubber in a mass content of 0.5% to 70%,
   the first pH adjuster and the second pH adjuster each are independently added at an amount of 0.0001% to 10% of a weight of the natural rubber latex,
   the surfactant is added at an amount of 0.0001% to 20% of the weight of the natural rubber latex,
   the first preservative and the second preservative each are independently added at an amount of 0.0001% to 20% of a weight of the natural rubber latex, and
   the first creaming agent and the second creaming agent each are independently added at an amount of 0.0001% to 40% of the weight of the natural rubber latex.

2. The processing method according to claim 1, wherein, in step 1), urea and derivatives of the urea or a protease is added to the natural rubber latex, then the first preservative is added to obtain the first resulting mixture, and the first resulting mixture is thoroughly stirred.

3. The processing according to claim 2, wherein, a polar organic solvent is added while the urea and the derivatives of the urea or the protease is added.

4. The processing according to claim 3, wherein, the polar organic solvent is at least one selected from the group consisting of methanol, ethanol, diethyl ether, dioxane, tetrahydrofuran (THF), ethylene oxide, cyclohexane, acetone, dihydroxyacetone (DHA), propanol, 2-propanol, n-butanol, dimethyl sulfoxide (DMSO), and dimethylacetamide (DMA), and the polar organic solvent is added at an amount of 0.0001% to 30% of a weight of the natural rubber latex.

5. The processing method according to claim 3, wherein, the derivatives of the urea are at least one selected from the group consisting of methyl urea, ethyl urea, n-propyl urea, isopropyl urea, n-butyl urea, isobutyl urea, and n-pentyl urea, and the urea and the derivatives of the urea are added at an amount of 0.0001% to 20% of a weight of the natural rubber latex; and the protease is at least one selected from the group consisting of alkaline protease, 2079 alkaline protease, trypsin, papain, bromelain, and superase bacterial protease, and the protease is added at an amount of 0.0001% to 15% of the weight of the natural rubber latex.

6. The processing method according to claim 3, wherein, the natural rubber latex in step 1) is one selected from the group consisting of fresh rubber latex from *Hevea brasiliensis* and concentrated rubber latex/skim latex of the fresh rubber latex from the *Hevea brasiliensis*, *Eucommia ulmoides* rubber latex and concentrated rubber latex/skim latex of the *Eucommia ulmoides* rubber latex and *Parthenium argentatum* rubber latex and concentrated rubber latex/skim latex of the *Parthenium argentatum* rubber latex.

7. The processing method according to claim 3, wherein, the first pH adjuster and the second pH adjuster each are independelty at least one selected from the group consisting of monopotassium phosphate (MKP), dipotassium phosphate (DKP), monosodium phosphate (MSP), disodium phosphate (DSP), sodium phosphate, potassium acetate, sodium acetate, sulfuric acid, hydrochloric acid, nitric acid, acetic acid, succinic acid, citric acid, sodium hydroxide, ammonia water, potassium hydroxide, sodium carbonate, and sodium bicarbonate; and the surfactant in step 1) is at least one selected from the group consisting of a non-ionic surfactant, an anionic surfactant, a cationic surfactant, and an amphoteric surfactant.

8. The processing according to claim 2, wherein, the derivatives of the urea are at least one selected from the group consisting of methyl urea, ethyl urea, n-propyl urea, isopropyl urea, n-butyl urea, isobutyl urea, and n-pentyl urea, and the urea and the derivatives of the urea are added at an amount of 0.0001% to 20% of a weight of the natural rubber latex; and the protease is at least one selected from the group consisting of alkaline protease, 2079 alkaline protease, trypsin, papain, bromelain, and superase bacterial protease, and the protease is added at an amount of 0.0001% to 15% of the weight of the natural rubber latex.

9. The processing method according to claim 2, wherein, the natural rubber latex in step 1) is one selected from the group consisting of fresh rubber latex from *Hevea brasiliensis* and concentrated rubber latex/skim latex of the fresh rubber latex from the *Hevea brasiliensis, Eucommia ulmoides* rubber latex and concentrated rubber latex/skim latex of the *Eucommia ulmoides* rubber latex and *Parthenium argentatum* rubber latex and concentrated rubber latex/skim latex of the *Parthenium argentatum* rubber latex.

10. The processing method according to claim 2, wherein, the first pH adjuster and the second pH adjuster each are independently at least one selected from the group consisting of monopotassium phosphate (MKP), dipotassium phosphate (DKP), monosodium phosphate (MSP), disodium phosphate (DSP), sodium phosphate, potassium acetate, sodium acetate, sulfuric acid, hydrochloric acid, nitric acid, acetic acid, succinic acid, citric acid, sodium hydroxide, ammonia water, potassium hydroxide, sodium carbonate, and sodium bicarbonate; and the surfactant in in step 1) is at least one selected from the group consisting of a non-ionic surfactant, an anionic surfactant, a cationic surfactant, and an amphoteric surfactant.

11. The processing method according to claim 2, wherein, the first preservative and the second preservative each are independently at least one selected from the group consisting of zinc oxide, benzoic acid, sodium benzoate, ammonium naphthenate, polyhexamethyleneguanidine (PHMG) and polymer derivatives of the PHMG, tetramethylthiuram disulfide, calcium propionate, sodium diacetate, methyl p-hydroxybenzoate, ethyl p-hydroxybenzoate, propyl p-hydroxybenzoate, butyl p-hydroxybenzoate, and potassium sorbate; and the first creaming agent and the second creaming agent each are independently at least one selected from the group consisting of a natural water-soluble polymer and modified water-soluble polymers of the natural water-soluble polymer, and a synthetic water-soluble polymer.

12. The processing method-according to claim 1, wherein, the natural rubber latex in the steps 1) is one selected from the group consisting of fresh rubber latex from *Hevea brasiliensis* and concentrated rubber latex/skim latex of the fresh rubber latex from the *Hevea brasiliensis, Eucommia ulmoides* rubber latex and concentrated rubber latex/skim latex of the *Eucommia ulmoides* rubber latex and *Parthenium argentatum* rubber latex and concentrated rubber latex/skim latex of the *Parthenium argentatum* rubber latex.

13. The processing method according to claim 1, wherein, the first pH adjuster and the second pH adjuster each are independently at least one selected from the group consisting of monopotassium phosphate (MKP), dipotassium phosphate (DKP), monosodium phosphate (MSP), disodium phosphate (DSP), sodium phosphate, potassium acetate, sodium acetate, sulfuric acid, hydrochloric acid, nitric acid, acetic acid, succinic acid, citric acid, sodium hydroxide, ammonia water, potassium hydroxide, sodium carbonate, and sodium bicarbonate; and the surfactant in the step 1) is at least one selected from the group consisting of a non-ionic surfactant, an anionic surfactant, a cationic surfactant, and an amphoteric surfactant.

14. The processing method according to claim 13, wherein, the non-ionic surfactant is at least one selected from the group consisting of a polyoxyalkylene ester surfactant, a polyol fatty acid ester surfactant, a polyoxyalkylene ether surfactant, an alkyl polyglucoside (APG) surfactant, and a sugar fatty acid ester surfactant; the anionic surfactant is at least one selected from the group consisting of diphenyl ether sulfonate, alkylbenzene sulfonate, alkyl naphthalene sulfonate, naphthalene sulfonate, alkyl sulfonate, dialkyl sulfosuccinate, α-olefin sulfonate, α-sulfonated fatty acid salt, alkyl sulfate, polyoxyalkylene stilbene phenol sulfate, polyoxyalkylene sulfate, tristyrene phenol sulfate, polyoxyalkylene phenyl ether sulfate, alkyl sulfate ester salt, polyoxyalkylene alkyl sulfate, polyoxyalkylene alkyl phenyl ether sulfate, polyoxyalkylene tristyrenated phenol sulfate, polyoxyalkylene distyrenated phenol sulfate, alkyl phosphate, polyoxyalkylene phosphate, alkyl phosohate salt, and polyoxyalkylene phosphate salt; the cationic surfactant is at least one selected from the group consisting of imidazolinium salt, alkyl amine salt, an alkyl amine derivative, and an alkyl amine quaternary ammonium compound; and the amphoteric surfactant is at least one selected from the group consisting of an amino acid surfactant, an amine oxide surfactant, and a betaine surfactant.

15. The processing method according to claim 1, wherein, the first preservative and the second preservative each are independently at least one selected from the group consisting of zinc oxide, benzoic acid, sodium benzoate, ammonium naphthenate, polyhexamethyleneguanidine (PHMG) and polymer derivatives of the PHMG, tetramethylthiuram disulfide, calcium propionate, sodium diacetate, methyl p-hydroxybenzoate, ethyl p-hydroxybenzoate, propyl p-hydroxybenzoate, butyl p-hydroxybenzoate, and potassium sorbate; and the first creaming agent and the second creaming agent each are independetly at least one selected from the group consisting of a natural water-soluble polymer and modified water-soluble polymers of the natural water-soluble polymer, and a synthetic water-soluble polymer.

16. The processing method according to claim 15, wherein, the natural water-soluble polymer and the modified water-soluble polymers of the natural water-soluble polymer are at least one selected from the group consisting of gum arabic, linseed gum, guar gum, bone glue, carrageenan, gelatin, locust bean gum, pectin, xanthan gum, konjac gum, tannin extract, *Abelmoschus manihot* gum, *Bletilla hyacinthina* gum, trehalose, ammonium alginate, sodium alginate, calcium alginate, potassium alginate, propylene glycol alginate (PGA), chitosan, chitosan oligosaccharide, water-soluble chitosan, carboxylated chitosan, chitosan salt, chitosan sulfate, hyaluronic acid-like chitosan, a copolymer of chitosan and polyvinylpyrrolidone (PVP), mucopolysaccharide, hyaluronic acid, carboxymethyl cellulose (CMC), hydroxyethyl cellulose (HEC), hydroxypropyl cellulose (HPC), methyl cellulose, ethyl cellulose, and cellulose xanthate; and the synthetic water-soluble polymer is at least one selected from the group consisting of polyethyleneimine, Carbopoi resin, aluminum magnesium silicate, polyvinyl alcohol (PVA), a PVA copolymer, polyacrylamide (PAM), a PAM copolymer, polyacrylic acid, sodium polyacrylate, PVP, a PVP copolymer, polyethylene glycol (PEG), a quaternary ammonium salt polymer, polyoxyethylene, polyoxyethylene ether, polyoxypropylene, and polyglycerol glycidyl ether.

17. The processing method according to claim 1, wherein, the stirring in the steps 1), 2) and 4) is conducted for 20 min to 48 h at a stirring speed of 30 rpm to 600 rpm; and the standing in steps 2) and 4) is conducted for 5 h to 10 days.

18. The processing method according to claim 1, wherein, the first phase separation and the second phase separations in the steps 2) and 4) are identified by a visual inspection, a transmittance contrast, or an ultrasonic detection.

19. The processing method according to claim 1, wherein the processing method is used for reducing a non-rubber component content in the natural rubber latex.

20. A rubber latex, wherein the rubber latex is obtained by the processing method according to claim 1.

\* \* \* \* \*